US010359542B2

(12) United States Patent
Kayode et al.

(10) Patent No.: US 10,359,542 B2
(45) Date of Patent: Jul. 23, 2019

(54) GENERATING DYNAMICALLY CALIBRATED GEO-MODELS IN GREEN FIELDS

(71) Applicant: Saudi Arabian Oil Company, Dhahran (SA)

(72) Inventors: Babatope Kayode, Al-Khobar (SA); Faisal Thawad, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/404,674

(22) Filed: Jan. 12, 2017

(65) Prior Publication Data

US 2017/0285221 A1 Oct. 5, 2017

Related U.S. Application Data

(60) Provisional application No. 62/286,254, filed on Jan. 22, 2016.

(51) Int. Cl.
*G01V 99/00* (2009.01)
*E21B 49/00* (2006.01)
(Continued)

(52) U.S. Cl.
CPC ............ *G01V 99/005* (2013.01); *E21B 43/00* (2013.01); *E21B 47/06* (2013.01); *E21B 49/00* (2013.01); *G06F 17/11* (2013.01)

(58) Field of Classification Search
CPC ...... G01V 11/00; G01V 1/30; G06F 17/5009; E21B 49/00; E21B 43/00
See application file for complete search history.

(56) References Cited

U.S. PATENT DOCUMENTS

2009/0070086 A1   3/2009   Le Ravalec et al.
2009/0119082 A1   5/2009   Fitzpatrick et al.
(Continued)

FOREIGN PATENT DOCUMENTS

WO   2011/100009   8/2011

OTHER PUBLICATIONS

Tovar et al., "Improved Reservoir Description from Pressure Transients," SPE 170719, SPE Annual Technical Conference and Exhibition, Oct. 27-29, 2014, Amsterdam, Netherlands; 12 pages.

(Continued)

*Primary Examiner* — Brian Turner
(74) *Attorney, Agent, or Firm* — Fish & Richardson P.C.

(57) ABSTRACT

Techniques to generate dynamically calibrated geo-models green fields are described. A geo-model representing a field on which wells are drilled in a hydrocarbon-bearing formation adjusted to generate multiple adjusted geo-models. Each adjusted geo-model represents a variant of the numerical geo-model. Using each adjusted geo-model, multiple simulated rates of change of bottomhole pressures over time in a well drilled in the hydrocarbon-bearing formation are determined. A measured rate of change of bottomhole pressures over time in the well is compared with the multiple simulated rates of change of bottomhole pressures over time in the well. Based on a result of the comparing, the adjusted geo-model that yielded simulated rates of change of bottomhole pressures that best matched the measured rate of change of bottomhole pressure is identified. A geological property associated with the best-match adjusted geo-model is determined and presented in a geological property contour map of the hydrocarbon-bearing formation.

22 Claims, 13 Drawing Sheets

(51) Int. Cl.
*G06F 17/11* (2006.01)
*G06G 7/48* (2006.01)
*E21B 43/20* (2006.01)
*E21B 43/00* (2006.01)
*E21B 47/06* (2012.01)

(56) References Cited

U.S. PATENT DOCUMENTS

| | | | | |
|---|---|---|---|---|
| 2009/0319180 | A1* | 12/2009 | Robinson | G06Q 10/10 701/532 |
| 2011/0040536 | A1* | 2/2011 | Levitan | E21B 49/00 703/2 |
| 2013/0073272 | A1* | 3/2013 | Wallace | E21B 43/00 703/10 |
| 2014/0349268 | A1* | 11/2014 | Tazerout | G09B 23/40 434/276 |
| 2014/0350906 | A1* | 11/2014 | Killough | E21B 49/00 703/2 |

OTHER PUBLICATIONS

Jackson et al., "An Integrated Approach to Interval Pressure Transient Test Analysis Using Analytical and Numerical Methods," SPE 81515, SPE International, Middle East Oil Show, Jun. 9-12, 2003, Bahrain; 9 pages.

Landa et al., "A Procedure to Integrate Well Test Data, Reservoir Performance History and 4-D Seismic Information into a Reservoir Description," SPE 38653, SPE Annual Technical Conference and Exhibition, Oct. 5-8, 1997, San Antonio, TX; 16 pages.

Clarkson et al., "Relative permeability of CBM reservoirs: Controls on curve shape," International Journal of Coal Geology, vol. 88, No. 4, Dec. 1, 2011; pp. 204-217.

Wang et al., "A Practical Approach to History-matching Large, Multi-well SAGD Simulation Models: A Mackay River Case Study," SPE 165555, SPE Heavy Oil Conference Canada, Jun. 11-13, 2013, Calgary, Alberta, Canada; 11 pages.

Sarac et al., "Integrated History Matching on Interference Well Test Data in a Naturally Fractured Reservoir with Automated Adjoint Gradient Based Inversion Technique," SPE 181498, SPE International, SPE Annual Technical Conference and Exhibition, Sep. 26-28, 2016, Dubai, UAE; 19 pages.

Horne, "Listening to the Reservoir—Interpreting Data from Permanent Downhole Gauges," (Slide Presentation), SPE Distinguished Lecturer Program 2009-2010; 17 pages.

Chen et al., "A New Algorithm for Automatic History Matching," SPE 4545, Society of Petroleum Engineers Journal, vol. 14, No. 6, Dec. 1974; 16 pages.

O'sullivan et al., "State of the art geothermal reservoir simulation," Geothermics, vol. 30, No. 4, Aug. 2001; pp. 395-429.

Welty et al., "Automated History Matching of Well Tests," SPE 7695, SPE Reservoir Simulation Symposium, Jan. 31-Feb. 2, 1979, Denver, CO; 10 pages.

Kabir et al., "Experiences With Automated History Matching," SPE 79670, SPE Reservoir Simulation Symposium, Feb. 3-5, 2003, Houston, TX; 13 pages.

Masumoto, "Pressure Derivative Matching Method for Two Phase Fluid Flow in Heterogeneous Reservoir," SPE 59462, SPE Asia Pacific Conference on Integrated Modelling for Asset Management, Apr. 25-26, 2000, Yokohama, Japan; 8 pages.

Teng et al., "Weil Test by Design: Transient Modelling to Predict Behaviour in Extreme Wells," SPE 101872, SPE Asia Pacific Oil & Gas Conference and Exhibition, Sep. 11-13, 2006, Adelaide, Australia; 14 pages.

Zheng et al., "Geological Model Evaluation through Well Test Simulation: A Case Study from the Wytch Farm Oilfiled, Southern England," Journal of Petroleum Geology, vol. 30, No. 1, Jan. 1, 2007; pp. 41-58.

Verga et al., "An Effective Criterion to Prevent Injection Test Numerical Simulation from Spurious Oscillations," Oil and Gas Science and Techology, vol. 69, No. 4, Jan. 1, 2014; pp. 633-651.

International Search Report and Written Opinion of the International Searching Authority issued in International Application No. PCT/US2017/014232 dated Apr. 20, 2017; 14 pages.

Gulf Cooperation Council Examination Report issued in GCC Application No. GC 2017-32810 dated Dec. 27, 2018, 4 pages.

* cited by examiner

| Qo bopd | Time (hrs) |
|---|---|
| 350 | 19.749 |
| 0 | 38.798 |
| 320 | 48.154 |
| 260 | 62.176 |
| 240 | 64.395 |
| 0 | 93.814 |

FIG. 4A

```
START_OF_SIMULATION_DATE          Jun-5-2015 : 11 : 20: 01
END_OF_SIMULATION_DATE            Jun-25-2015 : 11 : 20: 01

DT_MIN                        0.00069
    DT_MAX                        0.00069

Jun-7-2015 : 08 : 38 : 38
    DT_MIN                        0.00001:157
    DT_MAX                        0.00001:157

Jun-7-2015 : 09 : 38 : 37
    DT_MIN                        0.00069
    DT_MAX                        0.00069

Jun-8-2015 : 22 : 25 : 01
    stop_simulation
```

FIG. 4B

```
WELLS
  GWELL Name = "JLDI188"   Type="Producer"   Fluid="Oil"   Qo=350 /
  ENDWELLS
  DATE Jun-9-2015 : 02 : 39 : 19
  WELLS
  GWELL Name = "JLDI188"   Type="Producer"   Fluid="Oil"   Qo=0 /
  ENDWELLS
  DATE Jun-9-2015 : 21 : 42 : 16
  WELLS
  GWELL Name = "JLDI188"   Type="Producer"   Fluid="Oil"   Qo=320 /
  ENDWELLS
  DATE Jun-10-2015 : 07 : 03 : 37
  WELLS
  GWELL Name = "JLDI188"   Type="Producer"   Fluid="Oil"   Qo=260 /
  ENDWELLS
  DATE Jun-10-2015 : 21 : 04 : 57
  WELLS
  GWELL Name = "JLDI188"   Type="Producer"   Fluid="Oil"   Qo=240 /
  ENDWELLS
  DATE Jun-10-2015 : 23 : 18 : 05
  WELLS
  GWELL Name = "JLDI188"   Type="Producer"   Fluid="Oil"   Qo=0 /
  ENDWELLS
  DATE Jun-12-2015 : 04 : 43 : 13
  WELLS
```

| Wel | Br | Test | s | Date | Res | Top[MD] | Bot[MD] | TOP[SS] | BOT[SS] | Qg | Qo | Qw | CGR | FBHP at datum | FWHP | Qg | Qo | Qw | FBHP at datum |
|---|---|---|---|---|---|---|---|---|---|---|---|---|---|---|---|---|---|---|---|
| | | | | | | | INPUT DATA | | | | TEST RESULTS | | | | | | Simulation Results | | |
| Well 1 | 1 | FB | 1 | 11/13/2014 | A | 14671 | 14786 | -12631 | -12684 | 21.8 | | | | 5674 | 4025 | 17.43 | 282.69 | 1.4533 | 200 |
| Well 2 | 0 | PTA | 1 | 2/28/2013 | ABC | 13849 | 15423 | -12585 | -12158 | 9.89 | 395 | 98 | 40 | 4133 | 2719 | 0 | 0 | 0 | 0 |
| Well 3 | 0 | FB | 1 | 10/26/2014 | A | 14125 | 14155 | -12850 | -12880 | 1.3 | | | | 1045 | 733 | 0.416 | 12.282 | 1.783 | 200 |
| Well 4 | 0 | FB | 1 | 11/30/2014 | A | 13955 | 13980 | -12729 | -12754 | 1.6 | | | | 1024 | 715 | 0.1645 | 3.4241 | 0.4753 | 200 |

| Wellname | Reservoir | Perm Multiplier |
|---|---|---|
| Well 1 | Res 1 | 1 |
| Well 1 | Res 2 | 0.02 |
| Well 2 | Res 1 | 1 |
| Well 2 | Res 2 | 0.42 |
| Well 3 | Res 1 | 3 |
| Well 3 | Res 2 | 0.33 |
| Well 4 | Res 1 | 3 |
| Well 4 | Res 2 | 0.33 |

GENERATING DYNAMICALLY CALIBRATED GEO-MODELS IN GREEN FIELDS

CROSS-REFERENCE TO RELATED APPLICATIONS

This application claims the benefit of priority of U.S. Patent Application No. 62/286,254, entitled "RMS Workflow for Generating Dynamically Calibrated Geo-models In Green Fields," filed Jan. 22, 2016, which is incorporated herein by reference in its entirety.

TECHNICAL FIELD

This disclosure relates to modeling geologic formations.

BACKGROUND

Industry standard has significantly shifted away from deterministic results provided by single best guess geological models towards probabilistic results based on multiple geological realizations. When a geologist completes a best guess geo-model using all available information from cores and logs, the only test of model validity at this point is that properties at well level should be consistent with core and log data. Information from core and log usually represent a few feet away from the well-bore and hence just represent only the well grid-block property. The algorithm and parameters used to distribute properties between well control points is a strong subject of sensitivity. So while hundreds of realizations may have the same properties at the well control points, they may widely differ away from the wells depending on the settings of variogram, azimuth, seeds, co-kriging etc. It is therefore necessary to screen these several realizations to see how robust their properties are away from the well control points.

While significant production data are not available on green fields, pressure transient data from delineation and/or development wells would usually be available. Also, pressure transient data could contain information reflecting properties within a radius of 1 km or more around tested wells. Hence pressure transient data are very good candidates to test the robustness of property distribution away from well control points.

SUMMARY

This specification describes technologies relating to an RMS Workflow for generating dynamically calibrated geo-models in green fields.

Certain aspects of the subject matter described here can be implemented as a computer-implemented method. At step (a), a numerical geo-model representing a field on which wells are drilled in a hydrocarbon-bearing formation is received. The numerical geo-model includes multiple grid blocks representing a portion of the formation. The multiple grid blocks are associated with a value representing a geological property of the portion of the formation. At step (b), multiple adjusted numerical geo-models are generated from the initial received numerical geo-model. Each adjusted numerical geo-model represents a variant of the received numerical geo-model. At step (c), multiple simulated rates of change of bottomhole pressures over time in a well drilled in the hydrocarbon-bearing formation are determined. Each simulated rate of change of bottomhole pressures over time is determined using a volumetric flow rate over time through the well, and is associated with an adjusted numerical geo-model. At step (d), a measured rate of change of bottomhole pressures over time in the well is received and, at step (e), compared with the multiple simulated rates of change of bottomhole pressures over time in the well. At step (f), based on a result of the comparing, a first simulated rate of change of bottomhole pressures over time is identified from the multiple simulated rates of change of bottomhole pressures over time. At step (g), an adjusted geological property value of the portion of the formation is identified. Adjusting the first simulated rate of change of bottomhole pressures over time based on the adjusted geological property value decreases the difference between the first simulated rate of change of bottomhole pressures over time and the measured rate of change of bottomhole pressures. At step (h), the adjusted geological property value is provided to be presented in a geological property contour map of the hydrocarbon-bearing formation.

This, and other aspects, can include one or more of the following features. To generate an adjusted numerical geo-model of the multiple adjusted numerical geo-models, volumetric flow through the multiple grid blocks of a first size can be simulated, and simulated bottomhole pressures over time can be measured responsive to the simulated volumetric flow. A time-shift can be applied to the rate of change of bottomhole pressures over time to correspond to a rate of change of bottomhole pressures over time simulated for the volumetric flow through second grid blocks of a second size smaller than the first size. The measured rate of change of bottomhole pressures over time can be obtained by measuring changes in bottomhole pressure over time in the well drilled in the hydrocarbon-bearing formation. A difference between the first simulated rate of change of bottomhole pressures over time and the measured rate of change of bottomhole pressures over time can be less than each difference between each remaining simulated rate of change of bottomhole pressures over time and the measured rate of change of bottomhole pressures over time. For each of the multiple simulated rates of change of bottomhole pressures over time, a simulated rate of change of bottomhole pressure over time is determined using Equations (1) and (2) described later. To identify the first simulated rate of change of bottomhole pressures over time, for each simulated rate of change of bottomhole pressures over time, a sum of squares error relative to the measured rate of change of bottomhole pressures over time can be determined using Equation (3) described later. Multiple sum of squares errors for the multiple simulated rates of changes of bottomhole pressures over time can be determined. Each sum of squares error can be determined relative to the measured rate of change of bottomhole pressures over time. The multiple sum of squares errors can be ranked in an ascending order. A simulated rate of change of bottomhole pressures having the lowest sum of square errors of the plurality of sum of square errors can be assigned as the first simulated rate of change of bottomhole pressures. The well can be a first well included in multiple wells drilled at respective locations in the hydrocarbon-bearing formation. The adjusted geological property value can be a first adjusted geological property value. For each remaining well of the multiple wells, steps (a), (b), (c), (d), (e), (f), (g) and (h) can be repeated. Multiple adjusted geological property values including the first adjusted geological property value can be received. A contour map of the hydrocarbon-bearing formation can be generated using the multiple adjusted geological property values and the locations in the hydrocarbon-bearing formation at which the multiple wells are drilled. On the contour map, multiple identifiers representing the respective multiple adjusted geological property values can be displayed at a multiple other identifiers representing the respective locations. At step (i), a fine adjustment to the adjusted geological property value of the portion of the formation can be performed. At step (j), the first simulated rate of change of bottomhole pressures can be modified based on the fine adjustment to the adjusted geological property value. Steps (i) and (j) can be iterated to decrease a difference between the first simulated rate of change of bottomhole pressures and the measured rate of change of bottomhole pressures.

Certain aspects of the subject matter described here can be implemented as a system including one or more processors and a computer-readable medium storing instructions executable by the one or more processors to perform operations described here.

Certain aspects of the subject matter described here can be implemented as a computer-readable medium storing instructions executable by the one or more processors to perform operations described here.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A shows a pressure transient time-stepping file.

FIG. 4B shows a formatted pressure transient time-stepping file.

FIG. 4C shows a formatted pressure transient time-stepping file.

FIG. 8 is a table 800 showing result of a production test for four wells in the first hydrocarbon formation.

FIG. 9 is a table showing permeability multipliers for different wells in the first and second hydrocarbon formations.

Like reference numbers and designations in the various drawings indicate like elements.

DETAILED DESCRIPTION

This disclosure describes techniques to determine a field development plan for a green field by constructing a new geological model of the field and predicting various field development assumptions. In some implementations, the field development plan is implemented by selecting a geo-model from among multiple geo-models to represent a hydrocarbon hydrocarbon formation, especially, a green field. One or more wells are usually available on a green field, and pressure transient data is usually collected for these well(s). The pressure transient data is a measure of bottom-hole pressure at each well over time before flow through the well reaches steady state. Starting with an initial geo-model, multiple geo-models are generated by varying the creation parameters of the initial geo-model. For each well and for each geo-model, flow through the well is simulated and pressure transient data is simulated. For each well, pressure derivative data is calculated from the measured pressure transient data. The pressure derivative is a change in pressure between two consecutive time values. Also, for each well and for each geo-model, an error value is determined between the measured pressure derivative and the simulated pressure derivative. Based on the error values, the multiple geo-models are ranked. A single geo-model representing the hydrocarbon hydrocarbon formation is selected based on the best ranked geo-model.

Figure 1:
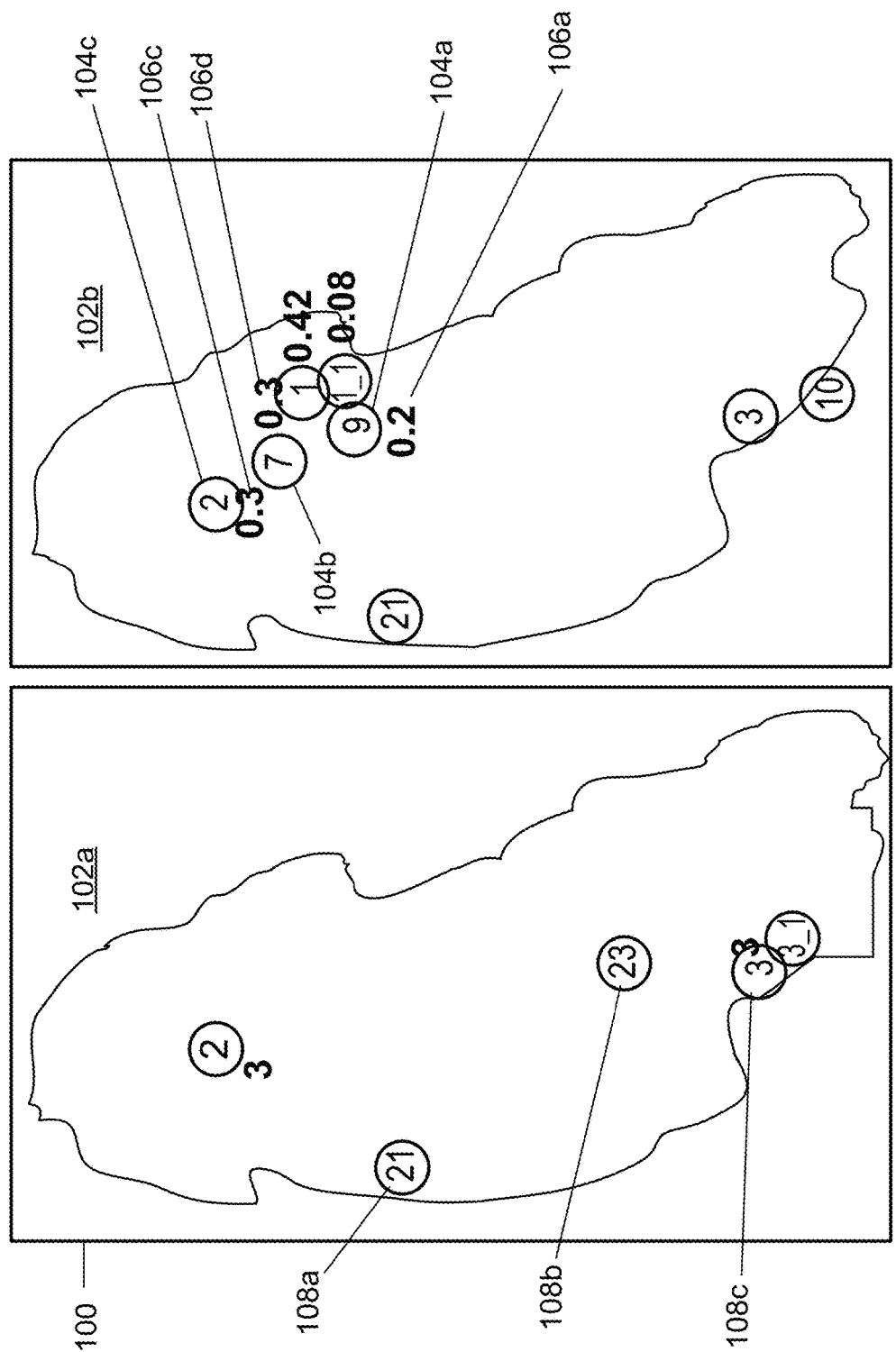
FIG. 1 is a schematic diagram of a user interface in which plan views of representations of two subterranean formations are displayed.

FIG. 1 is a schematic diagram of a user interface 100 in which plan views of representations of two subterranean formations are displayed. As described later, a computer system can display the user interface 100 on a display device operatively coupled to the computer system. In the example user interface 100, the computer system displays two images 102a and 102b, each representing a green field or a hydrocarbon reservoir. On each image representing the green field or the hydrocarbon reservoir, the computer system displays one or more objects. For example, each circle shown in each of images 102a and 102b represents a well drilled in the respective green field or hydrocarbon reservoir. For certain wells, for example, wells 104a, 104b, 104c, pressure transient data has been measured. For certain other wells, for example, wells 108a, 108b, 108c, pressure transient data has not been measured. For the wells for which the pressure transient data has been measured, permeability multiplier values, for example, a first value 106a, a second value 106b, a third value 106c, is displayed adjacent the respective well, for example, the first well 104a, the second well 104b, the third well 104c. The location of each object on each representation corresponds roughly to a location of a corresponding well in the corresponding subterranean formation. Adjacent to each object representing a well, a numerical value is displayed. Each numerical value represents a permeability multiplier coefficient representing a permeability through the subterranean formation at or near a location of the well represented by the object near which the numerical value is displayed. The user interface 100 is an end result of a workflow described with reference to FIG. 2. By implementing the workflow described with reference to FIG. 2, the computer system can determine the permeability multiplier coefficients and display the same in the user interface 100. The workflow implemented to display the user interface 100 is described with reference to the following figures. The process 200 can be implemented by the computer system (described later), for example, as computer-executable instructions stored on a computer-readable storage medium and executable by one or more processors of the computer system.

At 202, an initial geo-model is selected as a reference model. The initial geo-model can be built using a geo-modeling application and can serve as a necessary starting point for the workflow described here. The initial numerical geo-model represents the green field or the hydrocarbon reservoir of interest.

The computer system can implement the initial geo-model as multiple grid blocks. Each block can represent a portion of the field. Each block can have grid properties assigned to each grid block. The grid properties can be assigned based measuring core data as control points and extrapolating the measured core data over the entire grid-blocks, for example, over other grids where there are no measured core data.

For example, the geological properties of the initial geo-model can include one or more of permeabilities, porosities, water saturation levels, shale percentages (or combinations of them) of each grid-block. For a green field, only few wells may exist. The amount of measured core data for the green field may be limited to what is measured in the existing wells. Extrapolation of the measured core data over the entire green field can yield different geological properties (for example, different permeabilities) depending on the extrapolation approach used. Therefore, while values of the grid properties are the same at the well locations for which core data is available, the computer system can create different geo-models (also known as geological realizations) that represent different approaches of extrapolating data from known grids to other, unknown grids. As described later, the process 200 can be implemented to determine which of the several geo-models of grid property distribution is the most consistent with available dynamic data and further propose correction factors to improve the grid permeabilities included in this closest geo-model.

At 204, multiple geo-models are created based on different approaches of extrapolating known grid property values in order to estimate unknown grid property values, the goal to capture as much scenarios as necessary to capture the range of data uncertainty. For example, an adjustment can be introduced to the initial geo-model representing a well to generate an adjusted geo-model. Multiple adjusted geo-models can similarly be generated, each adjusted geo-model being a variant not only of the initial geo-model but of other adjusted geo-models as well. For example, as described above, the initial geo-model can include a permeability value. To generate the adjusted geo-models, the extrapolation approach used to extrapolate a measured permeability value of a control well to unknown permeability values can be varied. Examples of extrapolation approaches include geostatics (no trend and purely statistical), seismic acoustic impedance trend, facies trend, petrophysical rocktype (PRT) trend, to name a few. In some examples, a well can be associated with an initial geo-model and five adjusted geo-models, each generated by varying the extrapolation approach associated with the initial geo-model. The number of adjusted geo-models is provided as an example and can vary.

In some implementations, the computer system can simulate volumetric flow through the grid blocks of the full-field model. For the simulated volumetric flow, the computer system can measure the simulated bottom hole pressures over time responsive to the volumetric flow through the multiple grid blocks until the rate of change of bottom hole pressures stabilizes over time.

Figure 3A:
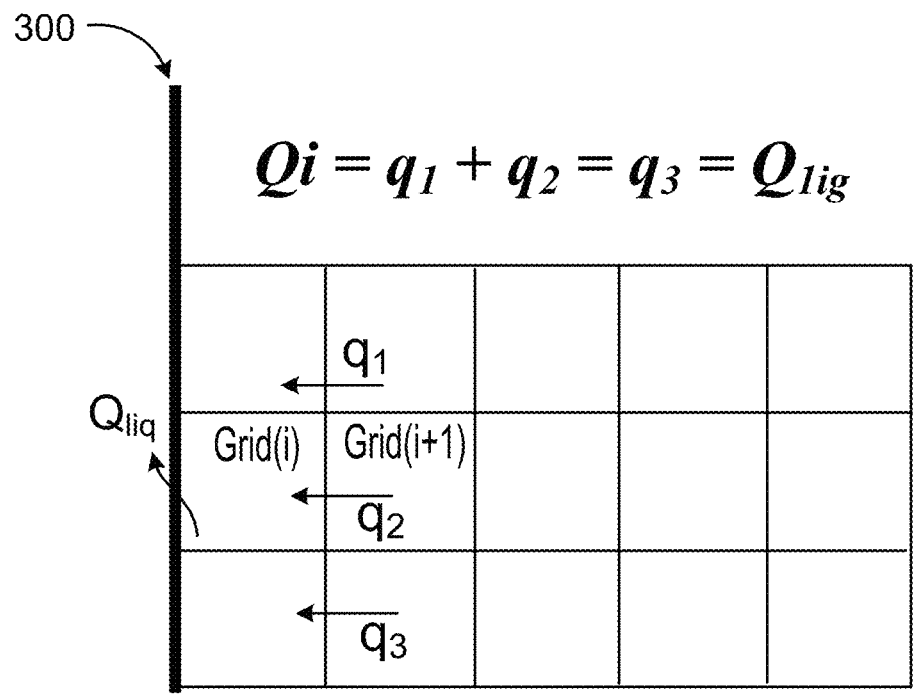
FIG. 3A shows an example of a grid block representing a wall of a well and the surrounding region.

FIG. 3A shows an example of a grid block 300a representing a wall of a well and the surrounding region. Pressure transient stabilization (that is, stabilization of the rate of change of bottom hole pressure over time) is dependent on grid block size, and is delayed as the grid size increases. During a pressure transient test, a well is shut-in at the well-head and bottom hole pressures are measured. In such situations, there is usually an after-flow effect due, in part, to wellbore storage, that causes the flow to continue from the sand face into the wellbore after the well has been shut-in at the surface. However, during numerical simulation of pressure transient, the computer system is implemented with an assumption that there is no flow into the well after shut-in. Nevertheless, simulation results show another kind of storage, named grid-block storage, that affects numerical pressure transient simulation. In FIG. 3A, $Q_{liq}$ is the pre-build-up well flow-rate, $Q_i$ is the flow rate from $Grid_{i+1}$ into $Grid_i$. At steady state conditions, $Q_{liq}=Q_i$. Immediately after shut-in, $Q_{liq}=0$ into the wellbore, but the inter-block fluid exchange $Q_i$ between $Grid_i$ and $Grid_{i+1}$ continues due to fluid compressibility.

Figure 3B:
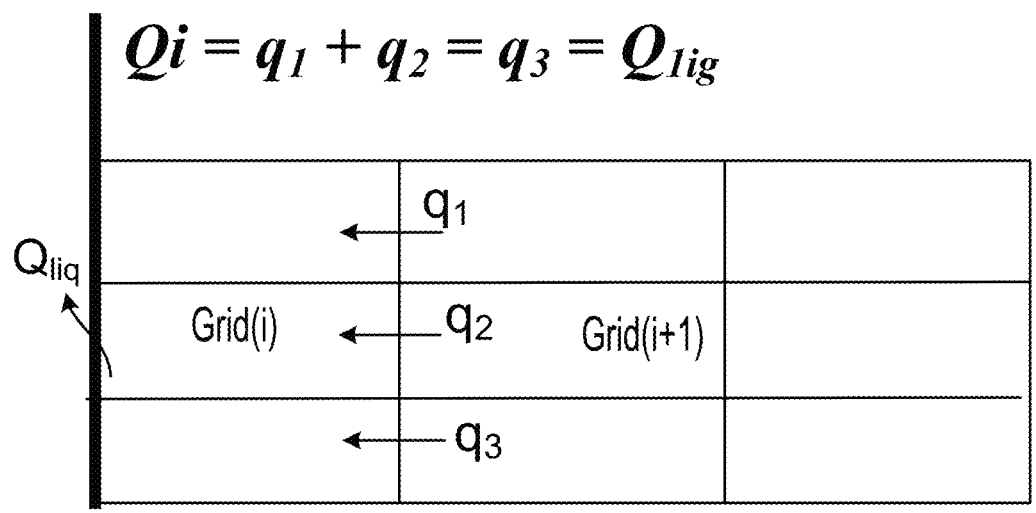
FIG. 3B shows an example of a grid block having a larger grid size than the grid block of FIG. 3A.

FIG. 3B shows an example of a grid block 300b having a larger grid size than the grid block 300a. Similar to simulated flow in grid block 300a, $Q_{liq}$ is the pre-build-up well flow-rate, $Q_i$ is the flow rate from $Grid_{i+1}$ into $Grid_i$. At steady state conditions, $Q_{liq}=Q_i$. Immediately after shut-in, $Q_{liq}=0$ into the wellbore, but the inter-block fluid exchange $Q_i$ between $Grid_i$ and $Grid_{i+1}$ continues due to fluid compressibility. After $\Delta t$ hrs into the build-up, the quantity of fluid that has moved from $Grid_{i+1}$ to $Grid_i$ for both grid blocks is the same. However, the rate of build-up of pressure is faster in the small-sized grid block 300a compared to the large-sized grid block 300b.

Thus, simulation of volumetric flow through a smaller-sized grid block results in faster stabilization of the pressure transient compared to stabilization of the pressure transient in the comparatively larger-sized grid block. The stabilized pressure transient data itself is substantially identical regardless of grid block size. Thus, in some implementations, the computer system can simulate volumetric flow through a well and the surrounding region by implementing a larger grid block, such as grid block 300b. The computer system can then implement a time-shift (to the right of the time scale) to the rate of change of bottom hole pressures over time; the time-shift can correspond to the time scale for simulation of volumetric flow through the well and the surrounding region by implementing a comparatively smaller grid block, such as grid block 300a. Because the stabilized pressure transient is the same regardless of grid block size, the time-shift implementation described here allows making full-field simulation runs with coarse (large) simulation grid-blocks, thereby saving simulation run-time while not adversely affecting the end result. In other words, by using the coarse simulation grid-blocks, significant simulation run times can be saved especially in instances where 100 geo-models are being implemented across five wells necessitating at least 500 simulations.

Figure 2:
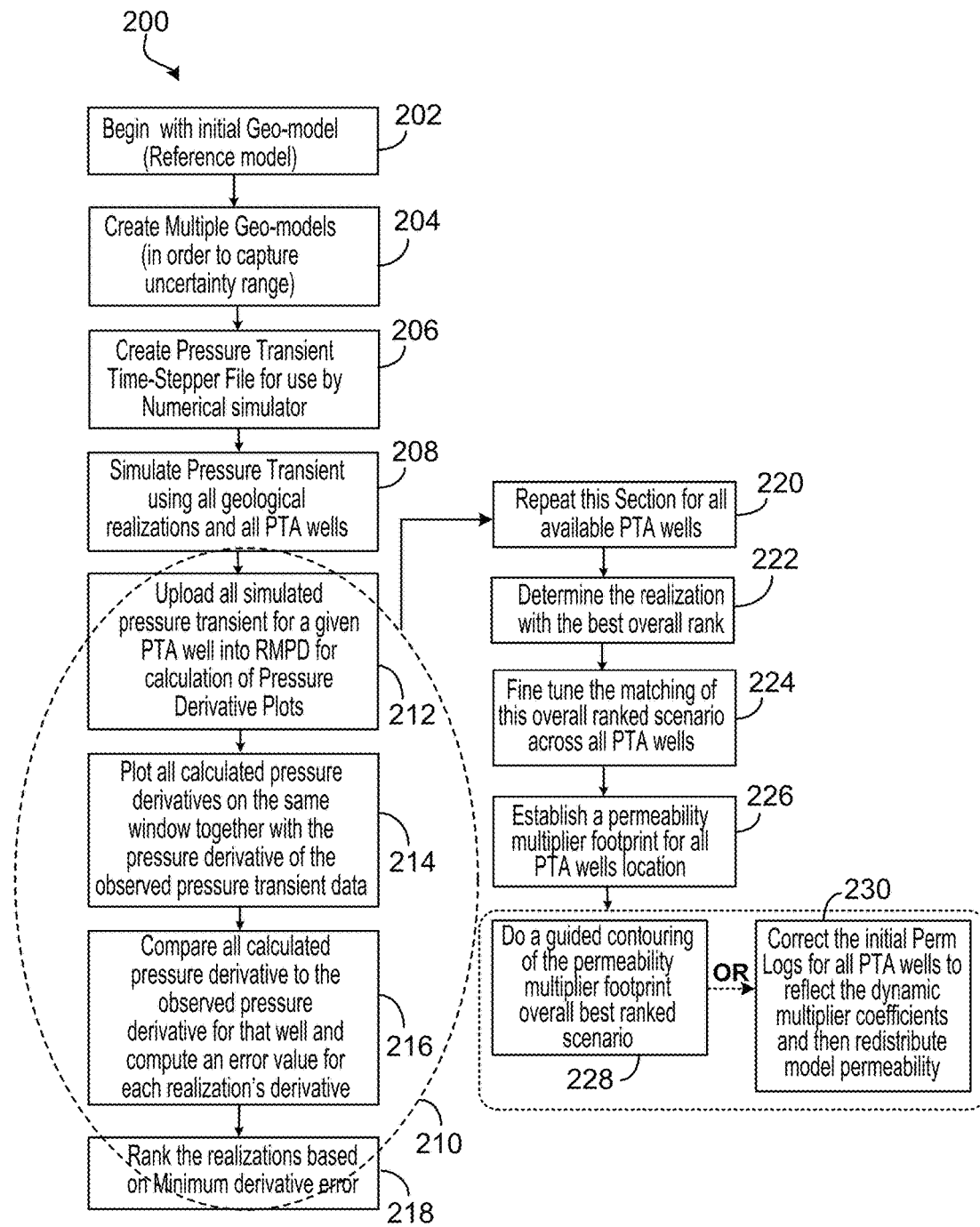
FIG. 2 is a workflow implemented by a computer system to display the user interface of FIG. 1.

Returning to the workflow 200 (also known as Rank, Match, Spread (RMS) workflow) of FIG. 2, at 206, a pressure transient time-stepping file is generated for use by a numerical simulator. The time-stepping file includes a flow-rate history versus time for the well. Using this file as input, the computer system can determine corresponding bottom-hole flowing pressure versus time for the well. Thus, the bottom-hole pressure versus time data is called a pressure transient. The time-stepping file can be obtained by direct measurement from wells on the field and can be stored in any format in which the file can be received and executed by the computer system.

At 208, pressure transients are simulated using all the several geo-models described earlier for the well, namely, the initial geo-model and each adjusted geo-model generated from the initial geo-model, each adjusted geo-model resulting from property extrapolation from known grid values in order to estimate the unknown grid property values. As described earlier, a field measure pressure transient data is previously available for the well. That is, a rate of change of bottomhole pressure in the well over time and corresponding to a set of change of flow-rates has been measured and stored in a format receivable and usable by the computer system. For a well that has already been drilled, the pressure transient measurement can be performed based on flow through the well. The pressure transients are simulated using all the geo-models to identify the best geo-model using the previously available pressure transient measurement for the well as a basis.

To generate each pressure transient for each geo-model associated with the well, the computer system imposes the previously measured pressure transient measurement, that is, the measured flow-rate versus time history, on each geo-model. As an initial matter, the computer system converts the measured flow-rate versus time history into a format that can be received and executed by the computer system to determine the simulated pressure transients. FIG. 4A shows a table of measured flow rate vs time, that is, a pressure transient time-stepping file. FIGS. 4B and 4C show examples of formatted pressure transient time-stepping files. The time-stepping file of FIG. 4A is obtained by direct measurement from wells on the field. FIGS. 4B and 4C show the pressure transient time-stepping file formatted into a format that the computer system implementing workflow 200 can receive and execute.

Using the information shown in FIGS. 4B and 4C and using Equations 1 and 2 shown below, the computer system generates a data-file of flowrate and pressure versus time, which is used as the source file for calculation and visualization of derivative and comparison with the derivative of historical pressure transient, as described with reference to step 212.

$$Derv_i = \frac{\Delta P_{i+1} - \Delta P_{i-1}}{Sn(\Delta t_{i+1}) - Sn(\Delta t_{i-1})} \quad \text{(Equation 1)}$$

$$Sn(\Delta t) = \sum_{i=1}^{n-1} \frac{q_i - q_{i-1}}{q_n - q_{n-1}} \log(t_n - t_i + \Delta t) + \log \Delta t \quad \text{(Equation 2)}$$

In Equations 1 and 2, P represents pressure (for example, in pounds per square inch), q represents flow rate (for example, in barrels per day) and t represents time.

Figure 5A:
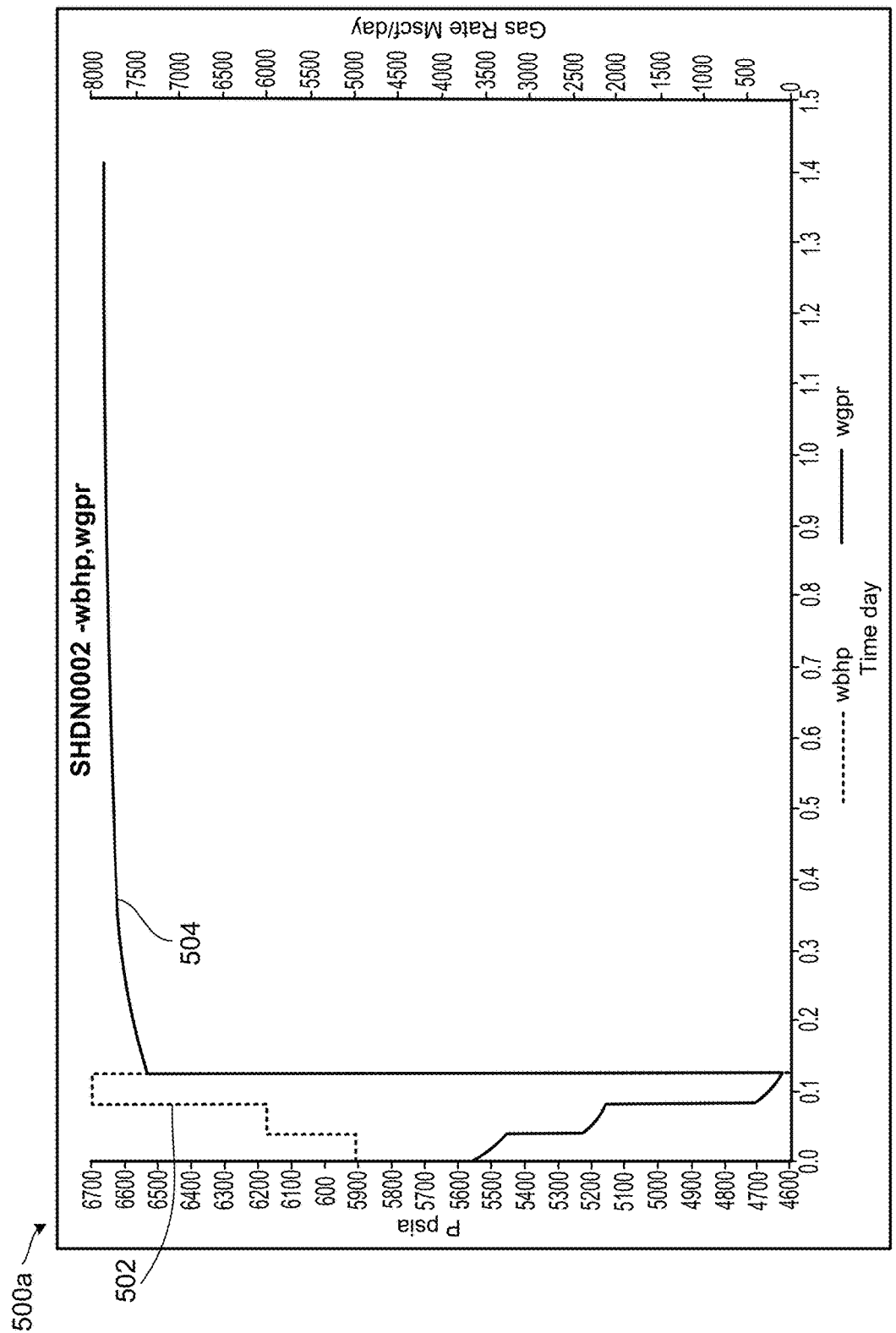
FIG. 5A is a plot showing pressure versus time measurements for the flow-after-flow test implemented by the industry standard PTA tool and using the computer system.

To verify the accuracy of the pressure transient derivative calculation by the computer system, a flow-after-flow test was created for a single well within a channel boundary. In the flow-after-flow test, the pressure was measured for a given flow rate; then, the flow rate was modified in a step-wise fashion, and the pressure measurement was repeated. The pressure and rate information obtained from the flow-after-flow test was imported into an industry standard pressure transient analysis (PTA) tool (KAPPA) and also into the computer system, and the outputs were compared. FIG. 5A is a plot 500a showing pressure versus time measurements for the flow-after-flow test implemented by the industry standard PTA tool and using the computer system. The line 502 in plot 500a is the output of the flow-after-flow test showing a step-wise change in flow rate. The line 504 in plot 500a is the corresponding pressure transient simulated for this imposed flow-rate history. The simulated flow rate and pressure data are then used to verify the output of workflow 200 against the industry standard tool (KAPPA) by comparing the superposition plot and log-log plot described with reference to FIGS. 5B and 5C, respectively.

Figure 5B:
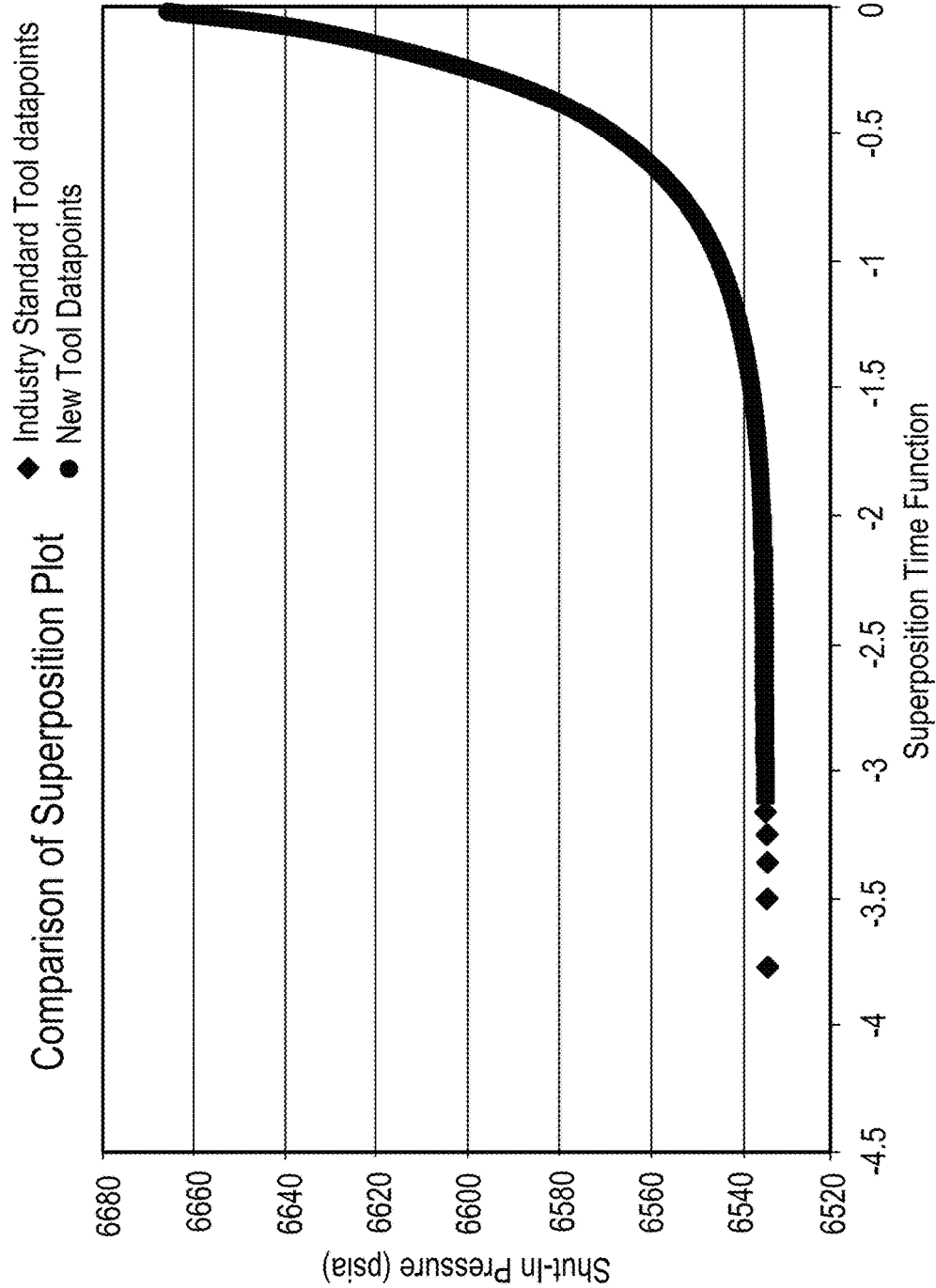
FIG. 5B is a superposition plot showing a comparison between the pressure and rate information obtained using the industry standard PTA tool and using the functionality described here.

FIG. 5B is a superposition plot 500b showing a comparison between the result obtained using the industry standard PTA tool and using the functionality implemented by the computer system. The superposition plot 500b shows shut-in pressure (psia) over a superposition time function. The circles are representations of the pressure versus time data obtained using the industry standard PTA tool. The squares are representations of the pressure versus time data obtained using the computer system. The plot shows a close match between the industry standard PTA data result and the computer system result, thereby verifying the accuracy of the computer system data.

Figure 5C:
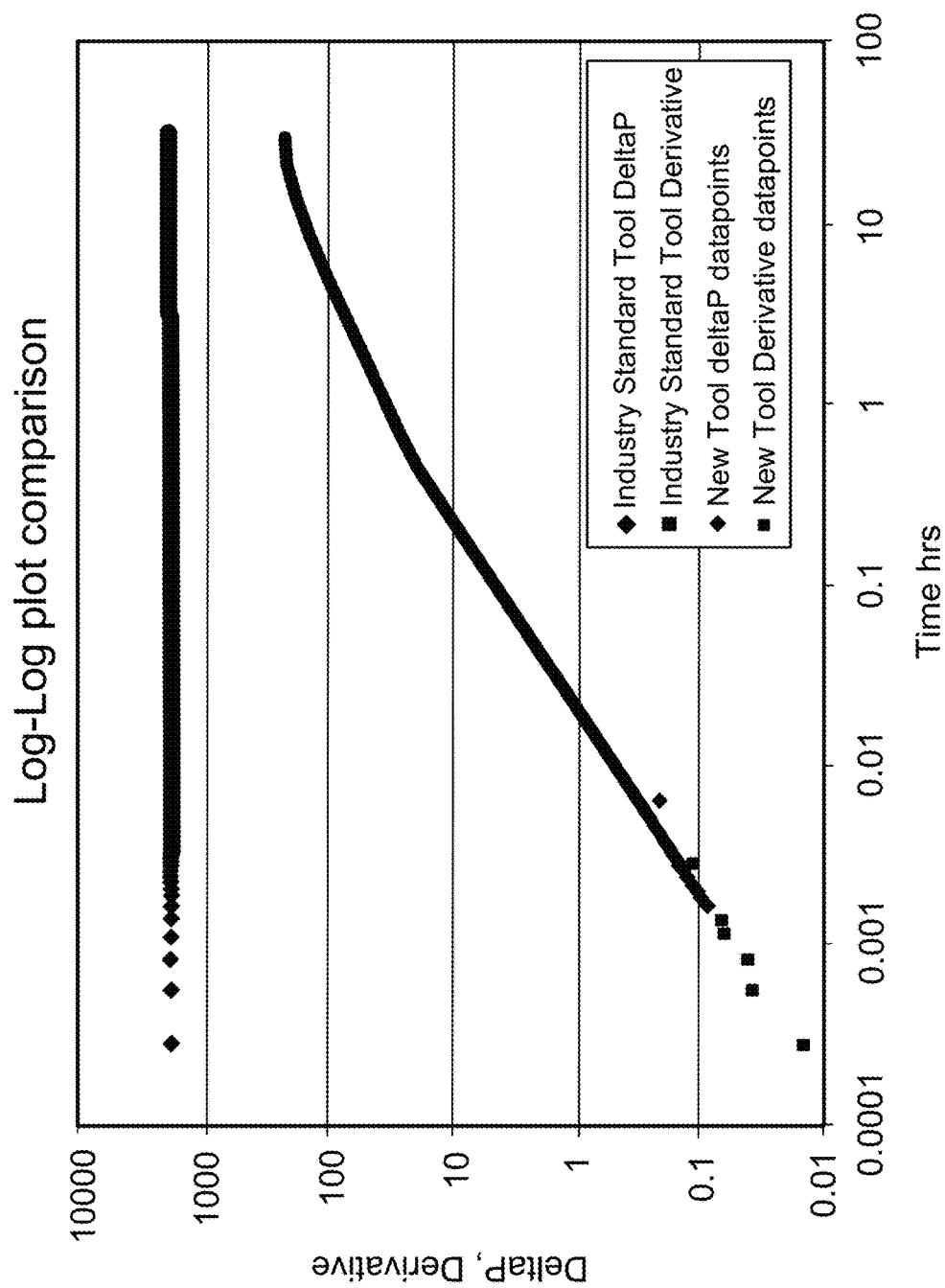
FIG. 5C is a log-lot comparison plot showing a comparison between the pressure and rate information obtained using the industry standard PTA tool and using the functionality described here.

FIG. 5C is a log-log comparison plot 500c showing a comparison between the log-log pressure derivative obtained using the industry standard PTA tool and using the functionality implemented by the computer system. The log-log comparison plot 500c compares two measurements—a change in pressure over time and a rate of change of pressure over time. The X- and Y-axes of the log-log comparison plot 500c are time (in hours) and a change in the pressure and a rate of change of pressure, respectively. The hollow diamond shapes represent the change in pressure over time obtained using the industry standard PTA tool. The solid diamond shapes represent the change in pressure over time obtained using the computer system. The hollow square shapes represent the rate of change of pressure over time using the industry standard PTA tool. The solid square shapes represent the rate of change of pressure over time obtained using the computer system. The overlapping plots show that the industry standard PTA tool data and the computer system data substantially match, thereby verifying the accuracy of the computer system data.

At 212, all simulated pressure transients are uploaded to the computer system for calculation of pressure derivative plots. As described later, the computer system implements a Rank Match Pressure Derivative (RMPD) functionality to identify the geo-model that yields simulated pressure transient data that is closest to the measured pressure transient data for the well.

Figure 6:
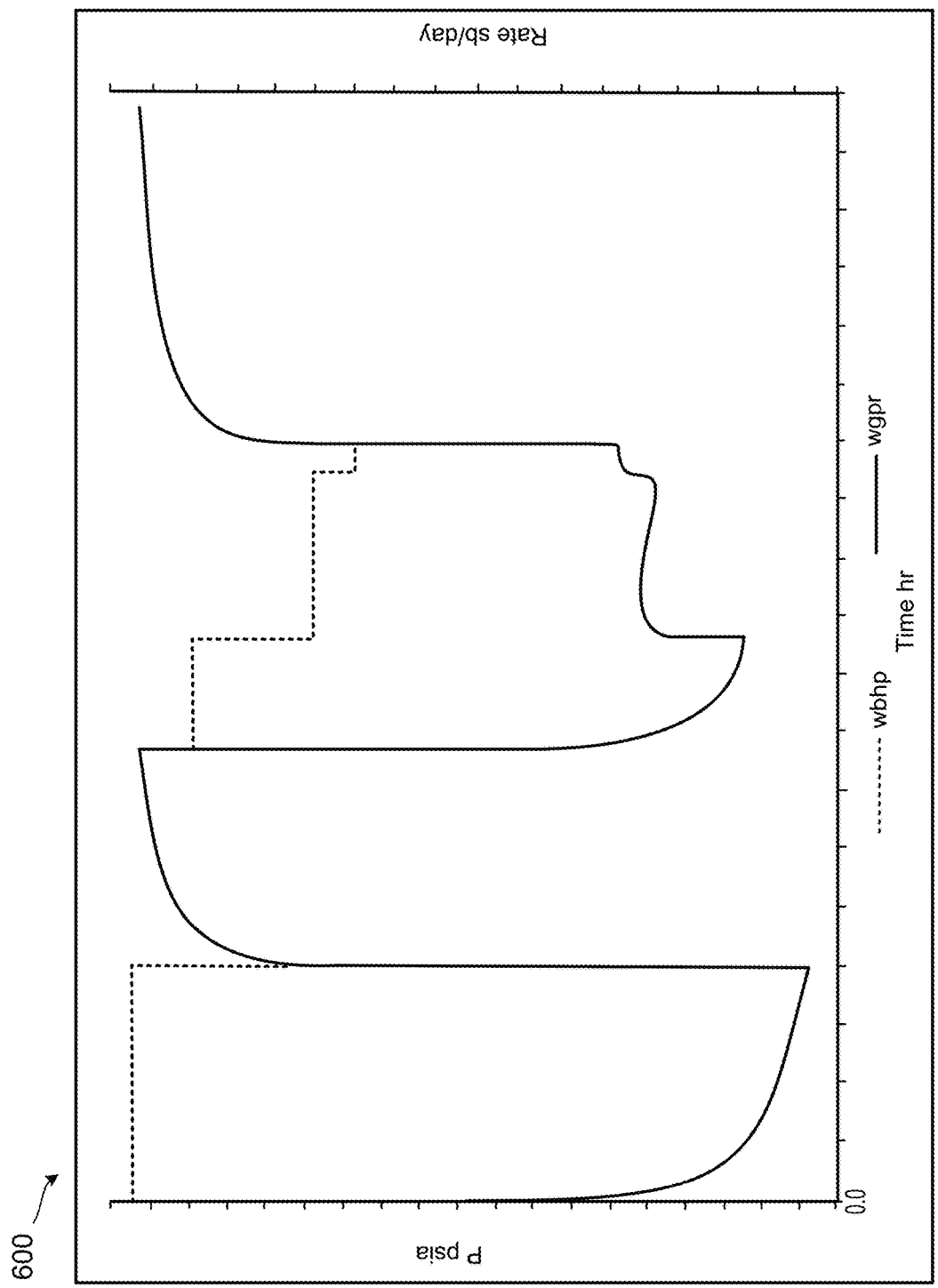
FIG. 6 is a plot showing multiple simulated pressure transients and the measured pressure transient plotted in the same window.

At 214, all calculated pressure derivatives are plotted on the same window together with the pressure derivative of the observed pressure transient data. FIG. 6 is a plot 600 showing multiple simulated pressure transients and the measured pressure transient plotted in the same window.

At 216, the pressure derivatives calculated for each geo-model associated with the well is compared with the pressure derivatives determined from measured flow-rate and pressure versus time values for the well. To do so, in some implementations, the computer system determines a match quality index (MQI) for each geo-model using Equation 3.

$$MQI = \sqrt{\Sigma(X_{obs} - X_{sim})^2 / N} \quad \text{(Equation 3)}$$

In Equation 3, $X_{obs}$ is each pressure derivative determined from the measured pressure transient, $X_{sim}$ is each pressure derivative determined from the simulated pressure transient and corresponding to the same time as $X_{obs}$, and N is the total number of pressure derivative values in the observed (measured) data. The MQI value represents a root-mean-square error between the pressure derivative determined from the measured pressure transient and that determined from the simulated pressure transient.

The number of simulated pressure derivative values can be different from (for example, can be greater than) the number of pressure derivative values determined from the measured pressure transient data. To determine the MQI for a geo-model, the time values for the pressure derivative determined from the measured pressure transient and those for the simulated pressure transient can correspond to each other. Thus, in an example in which an initial geo-model for a well was varied to result in five adjusted geo-models (a total of six geo-models), the computer system can determine 6 MQI values for the six respective geo-models.

At 218, the different geo-models for the well can be ranked based on their respective MQI values. A smaller MQI indicates a better match between the pressure derivative determined from the measured pressure transient and that determined from the simulated pressure transient. The smaller MQI also indicates that the geo-model associated with the smaller MQI better represents the actual conditions of the well. The computer system can rank the multiple geo-models in an order (ascending or descending) based on the respective MQI values.

The output of step 210 is a number of simulated pressure transients equal to a number of geo-models associated with the well. The previously described steps 212, 214, 216 and 218 are identified collectively as step 210 and have been described with reference to a well. At 220, the computer system can repeat the collection of steps 210 for each well drilled and for which pressure transient data has been. Upon repeating the steps 212, 214, 216 and 218 for all the wells with measured pressure transient data, the output of step 220 is a list of ranked MQI values for each well. For example, if there are five wells, then the output of step 220 is five lists of MQI values arranged in an order.

At 222, the geo-model with the best overall rank is determined. For example, the computer system can compare the top ranked MQI values from the multiple lists to identify the MQI value with the best rank, for example, the smallest MQI value. The computer system can identify the geo-model associated with the best ranked MQI value. In some instances, two or more top ranked MQI values can be the same or substantially similar. In other words, there may not be a clear best ranked MQI value. In such instances, the computer system can sum all the ranks corresponding to each geo-model, and compare the sum of the ranks. The computer system can identify the geo-model with the lowest sum as the geo-model with the best overall rank. At 224, the best ranked scenario can be fine-tuned across all the wells. In some instances, the best ranked geo-model may not necessarily perfectly match the actual well conditions. That is, the simulated pressure transient derivative may not closely match the pressure transient derivative determined from the measured values. In such instances, the computer system can further improve the simulated pressure transient derivative by adjusting, for example, the permeability associated with the best ranked geo-model. For example, the computer system can apply permeability multipliers on the selected best geo-model, recalculate pressure transient and compare the derivative plot of newly generated pressure transient with the measured pressure derivative until a suitable match of the two is obtained. This Matching phase of the RMS workflow is then repeated for wells having measure pressure transient but using only the chosen best ranked geo-model. The basis for the use of permeability multiplier is the following. The permeability measured on core represent average properties within a few inches around the wellbore, such small volume average properties may not be sufficient to properly describe the actual average production behavior of a well situated in a highly heterogeneous reservoir. Therefore, average properties are obtained that represent a larger scale volume. Pressure transient test provides this information, for example, it could provide average permeability values within a radius of 2-3 kilometers around the wellbore. Therefore, when the small volume core data is used to build a geological model, that geo-model is then used to reproduce the wells' actual production behavior. In cases of deviation, the Matching phase is implemented to determine the permeability multiplier coefficient to be used in correcting the core data values.

At 226, a permeability multiplier footprint can be established for the locations of all the wells. A permeability multiplier footprint is a collection of permeability multiplier requirements at the location of each well that obtains a satisfactory match between the simulated pressure transient derivative and the pressure transient derivative determined using the measured values. In some implementations, for each well, the computer system determines a permeability multiplier to adjust the top ranked geo-model by implementing, for each well, step 224 described earlier.

At 228, a guided contouring of the permeability multiplier is done over the overall best ranked scenario. For example, the computer system can use the permeability multipliers determined for the multiple wells as a multiplication factor for the core permeability data on each well. Alternatively, at 230, the initial permeability logs can be corrected for all the wells to reflect the dynamic multiplier coefficients, and the model permeability can be redistributed. The permeability logs are the initial core permeability versus depth data with which the initial geo-model was built. The dynamic multiplier coefficients is another name for the permeability multiplier footprints. To correct the initial permeability logs, the permeability value in the initial geo-model for each well can be multiplied by the permeability multiplier for that well. To redistribute model permeability, the properties of the well and the surrounding regions can be re-extrapolated using the modified permeability.

As described earlier, the workflow 200 principally resolves the problem created by the fact that the measured static properties from cores taken along a wellbore do not usually re-produce the well's production performance. Hence, the workflow 200 determines what correction factor to be applied on the static measurement so that the well would be able to re-produce its dynamic (production) behavior. During geo-modeling, however, the properties of the grid-blocks have been statistically derived (extrapolated) from the static data at well. Therefore, a correction factor is determined and applied at well level, the corrected values for other grid blocks need to be re-calculated (that is, extrapolated).

The geo-model determined by implementing the workflow can then be used as an input to a computer system that implements computer software applications to simulate hydrocarbon-bearing formations. The workflow described above can be applied to green fields or to brown fields. The computer system can generate and display the user interface 100 using the results of implementing the workflow. The user interface 100 is called the permeability multiplier footprint, which is a map of the permeability multiplier required at each well location as derived by the current workflow.

EXAMPLE

Figure 7A:
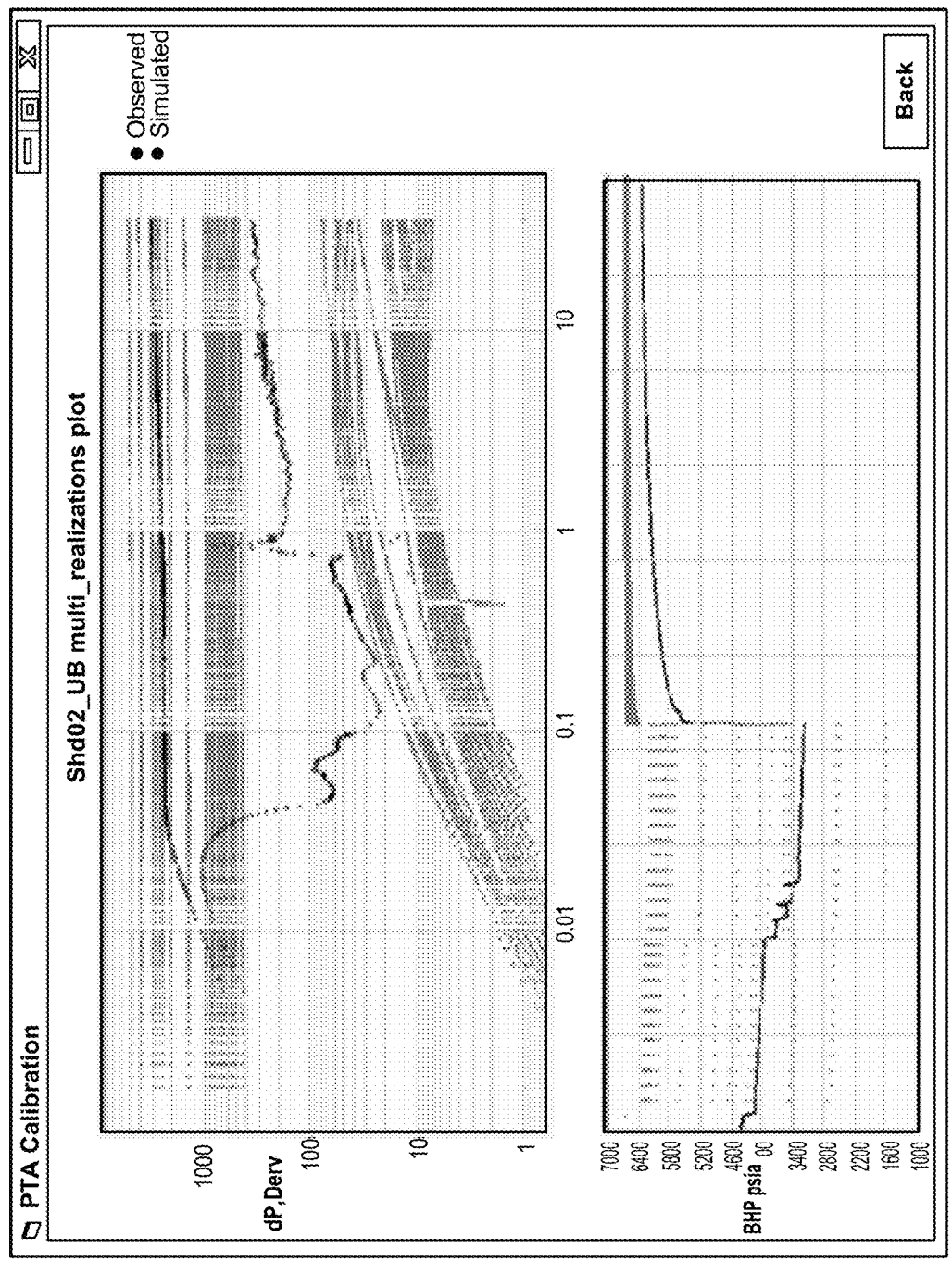
FIGS. 7A and 7B show plots comparing the best ranked geo-model from among 100 adjusted geo-models and an initial geo-model for an example well.
Figure 7B:
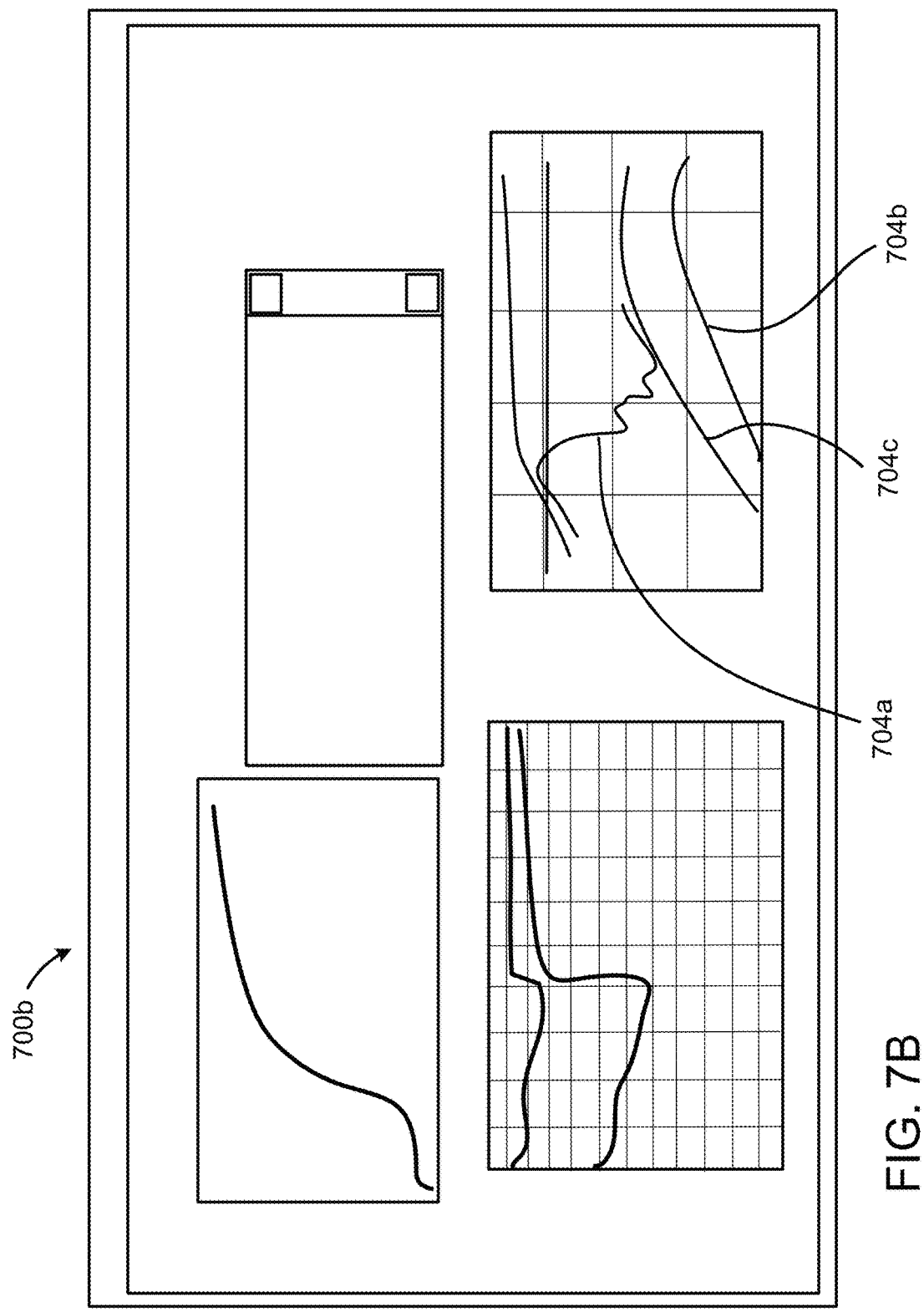

An initial geo-model calibrated at well control points to core and log data was constructed. Starting with this initial geo-model, 100 adjusted geo-models were created based on different settings of distribution seed, variogram, azimuth, etc. Changing any of these parameters result in different values of extrapolated permeability for the unknown gridblocks. They all constitute the various approaches for creating multiple realization geo-models. A histogram of gas in place was then calculated for all the geo-models. For each of five wells, pressure transient was simulated using all the 100 geological realizations yielding 500 simulation runs for the ranking phase. The geo-model ranking described earlier was implemented for all the geo-models across all the wells. FIGS. 7A and 7B show plots 700a and 700b, respectively, comparing the best ranked geo-model and an initial geo-model for a particular well. In plot 700a, the lines 702a in the plots represent pressure and pressure derivative plots for the several geo-models while the lines 702b are the measured pressure and pressure derivative data. In plot 700b, the lines 704a represent measured data, the lines 704b represent simulated data obtained using the initial geo-model, and the lines 704c represent the simulated data using the best-ranked model. The plot 700b shows that there is at least one geo-model that shows a closer match to the observed data than the initial geo-model. The ranking exercise was implemented for all the wells, and the best ranking geo-model was identified. The identified best ranking geo-model was used to implement fine-tuning to perfect the history match of the pressure transient for all the wells. Following the fine-tuning, final permeability multipliers were used to establish a permeability multiplier footprint for the entire model.

When compared with the best ranked geo-model, the initial geo-model was found to have over-estimated permeability of a first hydrocarbon formation, and under-estimated that of a second hydrocarbon formation. The observation was confirmed by determining that four wells in the first hydrocarbon formation had surface pressure and rate data that failed to reproduce the observed values when the initial geo-model was used. FIG. 8 is a table 800 showing result of a production test for four wells in the first hydrocarbon formation. Table 800 shows that, for Well 4, the observed test rate of 1.6 million cubic feet per day was the observed test rate at a bottom hole pressure of 715 psi, whereas the simulation showed only 0.165 million cubic feet per day at a maximum draw down implying that the initial permeability associated with the initial geo-model was too small. FIG. 9 is a table 900 showing permeability multipliers for different wells in the first and second hydrocarbon formations. Once the history matching permeability footprint had been established by implementing the workflow described earlier, the coefficients were provided as an input to fine tune the geo-models representing the two hydrocarbon formations.

Figure 10:
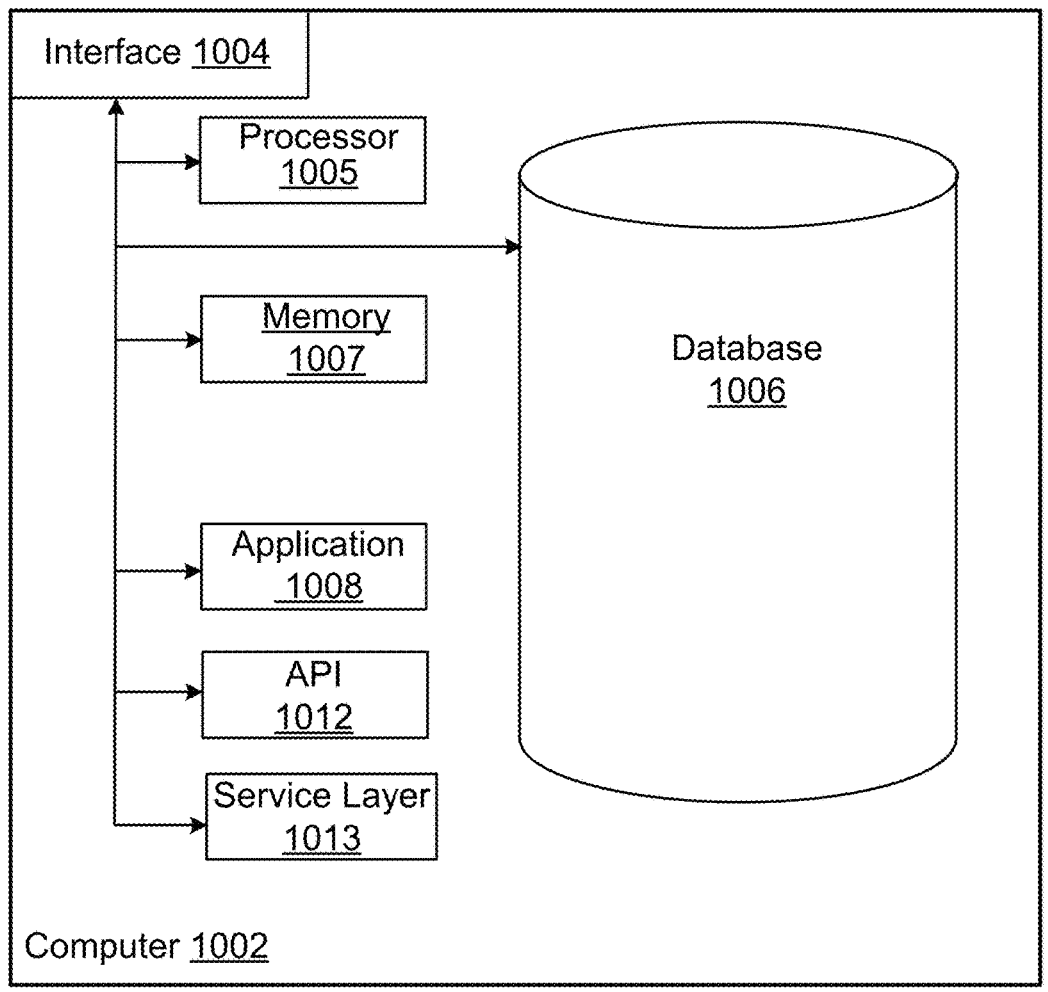
FIG. 10 is an example of a computer system.

FIG. 10 is a block diagram of an exemplary computer system 1000 used to provide computational functionalities associated with described algorithms, methods, functions, processes, flows, and procedures as described in the instant disclosure, according to an implementation. The illustrated computer 1002 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1002 may comprise a computer that includes an input device, such as a keypad, keyboard, touch screen, or other device that can accept user information, and an output device that conveys information associated with the operation of the computer 1002, including digital data, visual, or audio information (or a combination of information), or a graphical user interface (GUI).

The computer 1002 can serve in a role as a client, network component, a server, a database or other persistency, or any other component (or a combination of roles) of a computer system for performing the subject matter described in the instant disclosure. The illustrated computer 1002 is communicably coupled with a network (not shown). In some implementations, one or more components of the computer 1002 may be configured to operate within environments, including cloud-computing-based, local, global, or other environment (or a combination of environments).

At a high level, the computer 1002 is an electronic computing device operable to receive, transmit, process, store, or manage data and information associated with the described subject matter. According to some implementations, the computer 1002 may also include or be communicably coupled with an application server, e-mail server, web server, caching server, streaming data server, or other server (or a combination of servers).

The computer 1002 can receive requests over network 1030 from a client application (for example, executing on another computer 1002) and responding to the received requests by processing the said requests in an appropriate software application. In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003. In some implementations, any or all of the components of the computer 1002, both hardware or software (or a combination of hardware and software), may interface with each other or the interface 1004 (or a combination of both) over the system bus 1003 using an application programming interface (API) 1012 or a service layer 1013 (or a combination of the API 1012 and service layer 1013). The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems in a distributed environment that are connected to the network 1030 (whether illustrated or not). Generally, the interface 1004 comprises logic encoded in software or hardware (or a combination of software and hardware) and operable to communicate with the network 1030. More specifically, the interface 1004 may comprise software supporting one or more communication protocols associated with communications such that the network 1030 or interface's hardware is operable to communicate physical signals within and outside of the illustrated computer 1002.

The computer 1002 includes a processor 1005. Although illustrated as a single processor 1005 in FIG. 10, two or more processors may be used according to particular needs, desires, or particular implementations of the computer 1002. Generally, the processor 1005 executes instructions and manipulates data to perform the operations of the computer 1002 and any algorithms, methods, functions, processes, flows, and procedures as described in the instant disclosure.

The computer 1002 also includes a database 1006 that can hold data for the computer 1002 or other components (or a combination of both) that can be connected to the network 1030 (whether illustrated or not). For example, database 1006 can be an in-memory, conventional, or other type of database storing data consistent with this disclosure. In some implementations, database 1006 can be a combination of two or more different database types (for example, a hybrid in-memory and conventional database) according to particular needs, desires, or particular implementations of the computer 1002 and the described functionality. Although illustrated as a single database 1006 in FIG. 10, two or more databases (of the same or combination of types) can be used according to particular needs, desires, or particular implementations of the computer 1002 and the described functionality. While database 1006 is illustrated as an integral component of the computer 1002, in alternative implementations, database 1006 can be external to the computer 1002.

The computer 1002 also includes a memory 1007 that can hold data for the computer 1002 or other components (or a combination of both) that can be connected to the network 1030 (whether illustrated or not). For example, memory 1007 can be random access memory (RAM), read-only memory (ROM), optical, magnetic, and the like storing data consistent with this disclosure. In some implementations, memory 1007 can be a combination of two or more different types of memory (for example, a combination of RAM and magnetic storage) according to particular needs, desires, or particular implementations of the computer 1002 and the described functionality. Although illustrated as a single memory 1007 in FIG. 10, two or more memories 1007 (of the same or combination of types) can be used according to particular needs, desires, or particular implementations of the computer 1002 and the described functionality. While memory 1007 is illustrated as an integral component of the computer 1002, in alternative implementations, memory 1007 can be external to the computer 1002.

The application 1008 is an algorithmic software engine providing functionality according to particular needs, desires, or particular implementations of the computer 1002, particularly with respect to functionality described in this disclosure. For example, application 1008 can serve as one or more components, modules, applications, etc. Further, although illustrated as a single application 1008, the application 1008 may be implemented as multiple applications 1008 on the computer 1002. In addition, although illustrated as integral to the computer 1002, in alternative implementations, the application 1008 can be external to the computer 1002.

There may be any number of computers 1002 associated with, or external to, a computer system containing computer 1002, each computer 1002 communicating over network 1030. Further, the term "client," "user," and other appropriate terminology may be used interchangeably as appropriate without departing from the scope of this disclosure. Moreover, this disclosure contemplates that many users may use one computer 1002, or that one user may use multiple computers 1002.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   (a) receiving a numerical geo-model representing a field on which wells are drilled in a hydrocarbon-bearing formation, the numerical geo-model comprising a plurality of grid blocks representing a portion of the formation, the plurality of grid blocks associated with a value representing a geological property of the portion of the formation, the plurality of grid blocks being a coarse plurality of grid blocks to reduce simulation run-time;
   (b) generating a plurality of adjusted numerical geo-models from the initial received numerical geo-model, wherein each adjusted numerical geo-model represents a variant of the received numerical geo-model;
   (c) determining a plurality of simulated rates of change of bottomhole pressures over time in a well drilled in the hydrocarbon-bearing formation, each simulated rate of change of bottomhole pressures over time determined using a volumetric flow rate over time through the well, each simulated rate of change of bottomhole pressures over time in the well associated with an adjusted numerical geo-model;
   (d) applying a time-shift shift to the rate of change of bottomhole pressures over time to correspond to a rate of change of bottomhole pressures over time simulated for the volumetric flow through the plurality of grid blocks, wherein applying the time-shift maintains accuracy of the simulation while using coarse grid blocks;
   (e) receiving a measured rate of change of bottomhole pressures over time in the well;
   (f) comparing the measured rate of change of bottomhole pressures over time to the plurality of simulated rates of change of bottomhole pressures over time in the well;
   (g) based on a result of the comparing, identifying a first simulated rate of change of bottomhole pressures over time from the plurality of simulated rates of change of bottomhole pressures over time;
   (h) identifying an adjusted geological property value of the portion of the formation, wherein adjusting the first simulated rate of change of bottomhole pressures over time based on the adjusted geological property value decreases the difference between the first simulated rate of change of bottomhole pressures over time and the measured rate of change of bottomhole pressures;

(i) providing the adjusted geological property value to be presented in a geological property contour map of the hydrocarbon-bearing formation;

(j) updating a well production parameter at a well control point; and (k) producing the well based on the updated well production parameter.

2. The method of claim 1, wherein the measured rate of change of bottomhole pressures over time is obtained by measuring changes in bottomhole pressure over time in the well drilled in the hydrocarbon-bearing formation.

3. The method of claim 1, wherein a difference between the first simulated rate of change of bottomhole pressures over time and the measured rate of change of bottomhole pressures over time is less than each difference between each remaining simulated rate of change of bottomhole pressures over time and the measured rate of change of bottomhole pressures over time.

4. The method of claim 3, wherein Sn is determined as:

$$Sn(\Delta t) = \sum_{i=1}^{n-1} \frac{q_i - q_{i-1}}{q_n - q_{n-1}} \log(t_n - t_i + \Delta t) + \log \Delta t$$

wherein q represents volumetric flow rate, and t represents time.

5. The method of claim 1, wherein, for each of the plurality of simulated rates of change of bottomhole pressures over time, a simulated rate of change of bottomhole pressure over time ($Derv_i$) is determined as:

$$Derv_i = \frac{\Delta P_{i+1} - \Delta P_{i-1}}{Sn(\Delta t_{i+1}) - Sn(\Delta t_{i-1})},$$

wherein $\Delta P$ represents a change of bottomhole pressure and $\Delta t$ represents a change of time.

6. The method of claim 1, wherein identifying the first simulated rate of change of bottomhole pressures over time comprises determining, for each simulated rate of change of bottomhole pressures over time, a sum of squares error relative to the measured rate of change of bottomhole pressures over time.

7. The method of claim 6, wherein the sum of squares error (MQI) relative to the measured rate of change of bottomhole pressures is determined using $MQI=\sqrt{\Sigma(X_{obs}-X_{sim})^2/N}$, wherein $X_{obs}$ is the measured ra rate of change of bottomhole pressures over time, $X_{sim}$ is the simulated rate of change of bottomhole pressures over time, and N is the total number of pressure derivative values.

8. The method of claim 6, further comprising:
determining a plurality of sum of squares errors for the plurality of simulated rates of changes of bottomhole pressures over time, each sum of squares error relative to the measured rate of change of bottomhole pressures over time; and
ranking the plurality of sum of squares errors in an ascending order of the plurality of sum of squares errors.

9. The method of claim 8, further comprising assigning a simulated rate of change of bottomhole pressures having the lowest sum of square errors of the plurality of sum of square errors as the first simulated rate of change of bottomhole pressures.

10. The method of claim 1, wherein the well is a first well included in a plurality of wells drilled at respective locations in the hydrocarbon-bearing formation, wherein the adjusted geological property value is a first adjusted geological property value, and wherein the method further comprises:
for each remaining well of the plurality of wells, repeating steps (a), (b), (c), (d), (e), (f), (g), (h), and (i); and
receiving a plurality of adjusted geological property values including the first adjusted geological property value and an adjusted geological property value for each remaining well.

11. The method of claim 10, further comprising:
generating a contour map of the hydrocarbon-bearing formation using the plurality of adjusted geological property values and the locations in the hydrocarbon-bearing formation at which the plurality of wells are drilled; and
displaying, on the contour map, a first plurality of identifiers representing the respective plurality of adjusted geological property values at a second plurality of identifiers representing the respective locations.

12. The method of claim 1, further comprising:
(j) performing a fine adjustment to the adjusted geological property value of the portion of the formation;
(k) modifying the first simulated rate of change of bottomhole pressures based on the fine adjustment to the adjusted geological property value; and
iterating steps (j) and (k) to decrease a difference between the first simulated rate of change of bottomhole pressures and the measured rate of change of bottomhole pressures.

13. A system comprising:
one or more processors; and
a computer-readable medium storing instructions executable by the one or more processors to perform operations comprising:
(a) receiving a numerical geo-model representing a field on which wells are drilled in a hydrocarbon-bearing formation, the numerical geo-model comprising a plurality of grid blocks representing a portion of the formation, the plurality of grid blocks associated with a value representing a geological property of the portion of the formation, the plurality of grid blocks being a coarse plurality of grid blocks to reduce simulation run-time;
(b) generating a plurality of adjusted numerical geo-models from the initial received numerical geo-model, wherein each adjusted numerical geo-model represents a variant of the received numerical geo-model;
(c) determining a plurality of simulated rates of change of bottomhole pressures over time in a well drilled in the hydrocarbon-bearing formation, each simulated rate of change of bottomhole pressures over time determined using a volumetric flow rate over time through the well, each simulated rate of change of bottomhole pressures over time in the well associated with an adjusted numerical geo-model;
(d) applying a time-shift shift to the rate of change of bottomhole pressures over time to correspond to a rate of change of bottomhole pressures over time simulated for the volumetric flow through the plurality of grid blocks, wherein applying the time-shift maintains accuracy of the simulation while using coarse grid blocks;

(e) receiving a measured rate of change of bottomhole pressures over time in the well;

(f) comparing the measured rate of change of bottomhole pressures over time to the plurality of simulated rates of change of bottomhole pressures over time in the well;

(g) based on a result of the comparing, identifying a first simulated rate of change of bottomhole pressures over time from the plurality of simulated rates of change of bottomhole pressures over time;

(h) identifying an adjusted geological property value of the portion of the formation, wherein adjusting the first simulated rate of change of bottomhole pressures over time based on the adjusted geological property value decreases the difference between the first simulated rate of change of bottomhole pressures over time and the measured rate of change of bottomhole pressures;

(i) providing the adjusted geological property value to be presented in a geological property contour map of the hydrocarbon-bearing formation;

(j) updating a well production parameter at a well control point; and (k) producing the well based on the updated well production parameter.

14. The system of claim 13, wherein the measured rate of change of bottomhole pressures over time is obtained by measuring changes in bottomhole pressure over time in the well drilled in the hydrocarbon-bearing formation.

15. The system of claim 13, wherein a difference between the first simulated rate of change of bottomhole pressures over time and the measured rate of change of bottomhole pressures over time is less than each difference between each remaining simulated rate of change of bottomhole pressures over time and the measured rate of change of bottomhole pressures over time.

16. The system of claim 13, wherein, for each of the plurality of simulated rates of change of bottomhole pressures over time, a simulated rate of change of bottomhole pressure over time ($Derv_i$) is determined as:

$$Derv_i = \frac{\Delta P_{i+1} - \Delta P_{i-1}}{Sn(\Delta t_{i+1}) - Sn(\Delta t_{i-1})},$$

wherein $\Delta P$ represents a change of bottomhole pressure and $\Delta t$ represents a change of time.

17. The system of claim 16, wherein Sn is determined as:

$$Sn(\Delta t) = \sum_{i=1}^{n-1} \frac{q_i - q_{i-1}}{q_n - q_{n-1}} \log (t_n - t_i + \Delta t) + \log \Delta t$$

wherein q represents volumetric flow rate, t represents time.

18. The system of claim 13, wherein identifying the first simulated rate of change of bottomhole pressures over time comprises determining, for each simulated rate of change of bottomhole pressures over time, a sum of squares error relative to the measured rate of change of bottomhole pressures over time.

19. The The system of claim 18, wherein the sum of squares error (MQI) relative to the measured rate of change of bottomhole pressures is determined using $MQI = \sqrt{\Sigma(X_{obs} - X_{sim})^2 / N}$, wherein $X_{obs}$ is the measured a rate of change of bottomhole pressures over time, $X_{sim}$ is the simulated rate of change of bottomhole pressures over time, and N is the total number of pressure derivative values.

20. A computer-readable medium storing instructions executable by one or more processors to perform operations comprising:

(a) receiving a numerical geo-model representing a field on which wells are drilled in a hydrocarbon-bearing formation, the numerical geo-model comprising a plurality of grid blocks representing a portion of the formation, the plurality of grid blocks associated with a value representing a geological property of the portion of the formation, the plurality of grid blocks being a coarse plurality of grid blocks to reduce simulation run-time;

(b) generating a plurality of adjusted numerical geo-models from the initial received numerical geo-model, wherein each adjusted numerical geo-model represents a variant of the received numerical geo-model;

(c) determining a plurality of simulated rates of change of bottomhole pressures over time in a well drilled in the hydrocarbon-bearing formation, each simulated rate of change of bottomhole pressures over time determined using a volumetric flow rate over time through the well, each simulated rate of change of bottomhole pressures over time in the well associated with an adjusted numerical geo-model;

(d) applying a time-shift shift to the rate of change of bottomhole pressures over time to correspond to a rate of change of bottomhole pressures over time simulated for the volumetric flow through the plurality of grid blocks, wherein applying the time-shift maintains accuracy of the simulation while using coarse grid blocks;

(e) receiving a measured rate of change of bottomhole pressures over time in the well;

(f) comparing the measured rate of change of bottomhole pressures over time to the plurality of simulated rates of change of bottomhole pressures over time in the well;

(g) based on a result of the comparing, identifying a first simulated rate of change of bottomhole pressures over time from the plurality of simulated rates of change of bottomhole pressures over time;

(h) identifying an adjusted geological property value of the portion of the formation, wherein adjusting the first simulated rate of change of bottomhole pressures over time based on the adjusted geological property value decreases the difference between the first simulated rate of change of bottomhole pressures over time and the measured rate of change of bottomhole pressures; and (i) providing the adjusted geological property value to be presented in a geological property contour map of the hydrocarbon-bearing formation;

(j) updating a well production parameter at a well control point; and (k) producing the well based on the updated well production parameter.

21. The medium of claim 20, wherein the well is a first well included in a plurality of wells drilled at respective locations in the hydrocarbon-bearing formation, wherein the adjusted geological property value is a first adjusted geological property value, and wherein the operations further comprising:

for each remaining well of the plurality of wells, repeating steps (a), (b), (c), (d), (e), (f), (g), and (h); and receiving a plurality of adjusted geological property values including the first adjusted geological property value and an adjusted geological property value for each remaining well.

22. The medium of claim 21, the operations further comprising:

generating a contour map of the hydrocarbon-bearing formation using the plurality of adjusted geological property values and the locations in the hydrocarbon-bearing formation at which the plurality of wells are drilled; and displaying, on the contour map, a first plurality of identifiers representing the respective plurality of adjusted geological property values at a second plurality of identifiers representing the respective locations.

\* \* \* \* \*